(12) United States Patent
Dawson et al.

(10) Patent No.: US 12,235,402 B2
(45) Date of Patent: Feb. 25, 2025

(54) DATA-DRIVE SEPARATION OF DOWNGOING FREE-SURFACE MULTIPLES FOR SEISMIC IMAGING

(71) Applicant: SCHLUMBERGER TECHNOLOGY CORPORATION, Sugar Land, TX (US)

(72) Inventors: Andrew Dawson, West Hoathly (GB); Philippe Caprioli, Chelmsford (GB); Paal Kristiansen, Oslo (NO); Abdelghader Najeeb Mohamed Alemam, Crawley (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 362 days.

(21) Appl. No.: 17/904,526

(22) PCT Filed: Feb. 15, 2021

(86) PCT No.: PCT/US2021/018120
§ 371 (c)(1),
(2) Date: Aug. 18, 2022

(87) PCT Pub. No.: WO2021/167865
PCT Pub. Date: Aug. 26, 2021

(65) Prior Publication Data
US 2023/0077945 A1 Mar. 16, 2023

Related U.S. Application Data

(60) Provisional application No. 62/979,460, filed on Feb. 21, 2020.

(51) Int. Cl.
*G01V 1/36* (2006.01)
*G01V 1/34* (2006.01)
*G01V 1/38* (2006.01)

(52) U.S. Cl.
CPC .............. *G01V 1/362* (2013.01); *G01V 1/345* (2013.01); *G01V 1/36* (2013.01); *G01V 1/38* (2013.01);
(Continued)

(58) Field of Classification Search
USPC ........................................... 702/16
See application file for complete search history.

(56) References Cited

U.S. PATENT DOCUMENTS 8,559,266 B2   10/2013   Pica
9,110,191 B2 * 8/2015   Dragoset, Jr. ............ G01V 1/36
(Continued)

FOREIGN PATENT DOCUMENTS

| EP | 1474705 A1 | 11/2004 |
| EP | 2669713 A2 | 12/2013 |
| GB | 2448415 A | 10/2008 |
| WO | 2017024112 A1 | 2/2017 |

OTHER PUBLICATIONS

Amundsen, "Elimination of free-surface related multiples without need of the source wavelet", Geophysics, vol. 66, pp. 327-341, 2001.
(Continued)

*Primary Examiner* — Paul D Lee
(74) *Attorney, Agent, or Firm* — Jeffrey D. Frantz

(57) ABSTRACT

A method includes receiving seismic data including signals collected using a receiver, separating a downgoing wavefield from an upgoing wavefield in the signals, generating a modified downgoing wavefield by removing direct arrivals from the downgoing wavefield, estimating a first-order multiple reflection signal at least partially by deconvolving the modified downgoing wavefield and the downgoing wavefield, and generating a seismic image based at least in part on the estimated first-order multiple reflection signals.

20 Claims, 9 Drawing Sheets

(52) U.S. Cl.
CPC ........... *G01V 2210/1293* (2013.01); *G01V 2210/1295* (2013.01); *G01V 2210/1423* (2013.01); *G01V 2210/1425* (2013.01); *G01V 2210/32* (2013.01); *G01V 2210/56* (2013.01)

(56) References Cited

U.S. PATENT DOCUMENTS

| | | | | |
|---|---|---|---|---|
| 2003/0086335 | A1* | 5/2003 | Naville | G01V 1/42 367/58 |
| 2009/0245022 | A1 | 10/2009 | Dragoset, Jr. | |
| 2013/0329520 | A1* | 12/2013 | van Borselen | G01V 1/38 367/24 |
| 2015/0109881 | A1 | 4/2015 | Poole et al. | |
| 2016/0109590 | A1* | 4/2016 | Goertz | G01V 1/288 702/14 |
| 2017/0285204 | A1* | 10/2017 | Hornman | G01H 9/004 |
| 2019/0187313 | A1* | 6/2019 | Chemingui | G01V 1/38 |
| 2019/0257966 | A1* | 8/2019 | Cecconello | G01V 1/366 |
| 2020/0217977 | A1* | 7/2020 | Halliday | G01V 1/30 |

OTHER PUBLICATIONS

Hampson and Szumski, "Down/down deconvolution", DownUnder GeoSolutions, EAGE Seabed Seismic Today: From Acquisition to Application, Sep. 2020, EAGE2020, 5 pages.
Backus, "Water Reverberations—Their Nature and Elimination", Geophysics, vol. XXIV, No. 2. pp. 233-261, Apr. 1959.
Search Report and Written Opinion of International Patent Application No. PCT/US2021/018120 on May 21, 2021; 12 pages.
Extended Search Report issued in European Patent Application No. 21757600.8 dated Feb. 7, 2024, 8 pages.
Lameloise, C. et al., "Broadband Depth Imaging from Separated Wavefields", 74th EAGE Conference & Exhibition incorporating SPE EURPEC 2012, 5 pages.
Majdanski, M. et al., "Attenuation of free-surface multiples by up/down deconvolution for marine towed-streamer data", Geophysics, 2011, 76(6), 10 pages.
International Preliminary Report on Patentability of International Patent Application No. PCT/US2021/018120 dated Sep. 1, 2022, 8 pages.

* cited by examiner

DATA-DRIVE SEPARATION OF DOWNGOING FREE-SURFACE MULTIPLES FOR SEISMIC IMAGING

CROSS-REFERENCE TO RELATED APPLICATIONS

This application in a National Stage Entry of International Application No. PCT/US2021/018120, which was filed on Feb. 15, 2021, which claims priority to U.S. Provisional Patent Application Ser. No. 62/979,460, which was filed on Feb. 21, 2020. The entirety of this provisional application is incorporated herein by reference.

BACKGROUND

Ocean Bottom Seismometer (OBS), Ocean Bottom Cable (OBC), and Ocean Bottom Node (OBN) refer to types of marine seismic data acquisition systems. In these systems, generally, seismic receivers (hydrophones, geophones, etc.) are positioned at or near the ocean bottom, and a seismic source sends shots downward, from a shallower depth. This technique is often used to create recordings in a relatively quiet environment (in comparison to streamers) and/or where obstructions are present that may make using a streamer difficult.

Seismic data in this context, and in other marine and land-based contexts, may include a combination of several signals. Generally, a "primary" reflection is the signal that is sought to be extracted from the recorded signal. The primary represents a seismic wave that is reflected from a subsurface reflector (generally an interface between two types of rock) and then detected by a receiver as it returns upwards. Another signal that may be present is a direct arrival. In the OBS/OBC/OBN context, this may generally be a signal that propagates from the source through the water and directly to the receiver, without being reflected. The seismic signals also generally include multiple reflection signals (or "multiples") for short. Multiple reflections occur when a downgoing seismic wave is reflected by a reflector, but before returning to the receiver, is reflected at least one more time, by a second reflector before finally propagating to the receiver. The second reflector can be subsurface or may be a "free surface", e.g., the ocean surface. Multiple reflections are often considered a type of noise and have been the subject of many different techniques to identify and remove them from the seismic data, e.g., without removing the desired primary signals.

Recently, it has been recognized that multiples also contain complementary information about the reflectivity of the subsurface. Accordingly, separating multiples and primaries is used to image the primaries, but now also to image the multiples separately. Imaging of multiples has been shown to add value to the primary imaging particularly in areas where the illumination from the primaries is poor. Mirror migration commonly used on OBS data is an example of imaging first-order (i.e., one bounce off the free surface) receiver side free-surface down-going multiples. More recently, the value of imaging higher orders of multiples has also been demonstrated.

SUMMARY

Embodiments of the disclosure provide a method that includes receiving seismic data including signals collected using a receiver, separating a downgoing wavefield from an upgoing wavefield in the signals, generating a modified downgoing wavefield by removing direct arrivals from the downgoing wavefield, estimating a first-order multiple reflection signal at least partially by deconvolving the modified downgoing wavefield and the downgoing wavefield, and generating a seismic image based at least in part on the estimated first-order multiple reflection signal.

Embodiments of the disclosure also provide a non-transitory, computer-readable medium storing instructions that, when executed by at least one processor of a computing system, cause the computing system to perform operations. The operations include receiving seismic data including signals collected using a receiver, separating a downgoing wavefield from an upgoing wavefield in the signals, generating a modified downgoing wavefield by removing direct arrivals from the downgoing wavefield, estimating a first-order multiple reflection signal at least partially by deconvolving the modified downgoing wavefield and the downgoing wavefield, and generating a seismic image based at least in part on the estimated first-order multiple reflection signal.

Embodiments of the disclosure further provide A computing system that includes one or more processors, and a memory system including one or more non-transitory, computer-readable media storing instructions that, when executed by at least one processor of a computing system, cause the computing system to perform operations. The operations include receiving seismic data including signals collected using a receiver, separating a downgoing wavefield from an upgoing wavefield in the signals, generating a modified downgoing wavefield by removing direct arrivals from the downgoing wavefield, estimating a first-order multiple reflection signal at least partially by deconvolving the modified downgoing wavefield and the downgoing wavefield, and generating a seismic image based at least in part on the estimated first-order multiple reflection signal.

Thus, the computing systems and methods disclosed herein are more effective methods for processing collected data that may, for example, correspond to a surface and a subsurface region. These computing systems and methods increase data processing effectiveness, efficiency, and accuracy. Such methods and computing systems may complement or replace conventional methods for processing collected data. This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DESCRIPTION OF EMBODIMENTS

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object could be termed a second object, and, similarly, a second object could be termed a first object, without departing from the scope of the invention. The first object and the second object are both objects, respectively, but they are not to be considered the same object.

The terminology used in the description of the invention herein is for the purpose of describing particular embodiments only and is not intended to be limiting of the invention. As used in the description of the invention and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques and workflows that are in accordance with some embodiments. Some operations in the processing procedures, methods, techniques and workflows disclosed herein may be combined and/or the order of some operations may be changed.

Figure 1A:
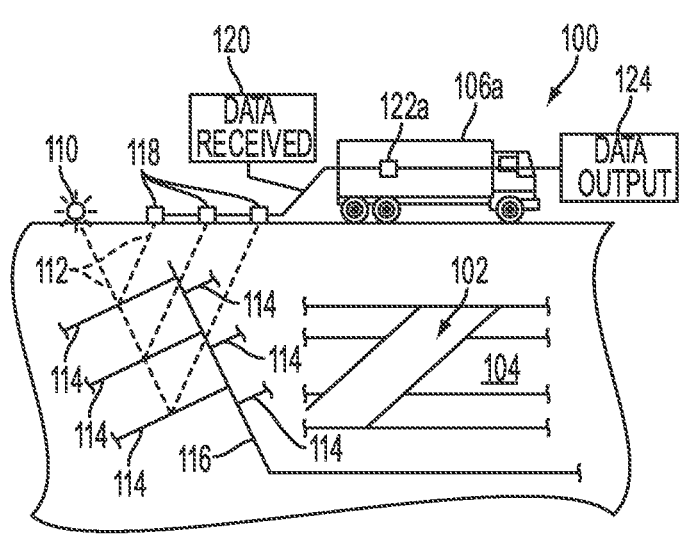
FIGS. 1A, 1B, 1C, 1D, 2, 3A, and 3B illustrate simplified, schematic views of an oilfield and its operation, according to an embodiment.

FIGS. 1A-1D illustrate simplified, schematic views of oilfield 100 having subterranean formation 102 containing reservoir 104 therein in accordance with implementations of various technologies and techniques described herein. FIG. 1A illustrates a survey operation being performed by a survey tool, such as seismic truck 106a, to measure properties of the subterranean formation. The survey operation is a seismic survey operation for producing sound vibrations. In FIG. 1A, one such sound vibration, e.g., sound vibration 112 generated by source 110, reflects off horizons 114 in earth formation 116. A set of sound vibrations is received by sensors, such as geophone-receivers 118, situated on the earth's surface. The data received 120 is provided as input data to a computer 122a of a seismic truck 106a, and responsive to the input data, computer 122a generates seismic data output 124. This seismic data output may be stored, transmitted or further processed as desired, for example, by data reduction.

Figure 1B:
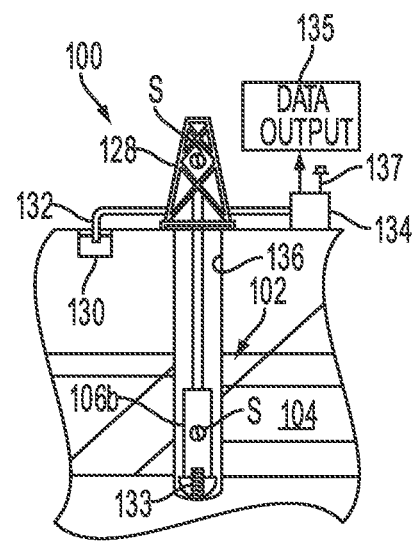

FIG. 1B illustrates a drilling operation being performed by drilling tools 106b suspended by rig 128 and advanced into subterranean formations 102 to form wellbore 136. Mud pit 130 is used to draw drilling mud into the drilling tools via flow line 132 for circulating drilling mud down through the drilling tools, then up wellbore 136 and back to the surface. The drilling mud is typically filtered and returned to the mud pit. A circulating system may be used for storing, controlling, or filtering the flowing drilling mud. The drilling tools are advanced into subterranean formations 102 to reach reservoir 104. Each well may target one or more reservoirs. The drilling tools are adapted for measuring downhole properties using logging while drilling tools. The logging while drilling tools may also be adapted for taking core sample 133 as shown.

Computer facilities may be positioned at various locations about the oilfield 100 (e.g., the surface unit 134) and/or at remote locations. Surface unit 134 may be used to communicate with the drilling tools and/or offsite operations, as well as with other surface or downhole sensors. Surface unit 134 is capable of communicating with the drilling tools to send commands to the drilling tools, and to receive data therefrom. Surface unit 134 may also collect data generated during the drilling operation and produce data output 135, which may then be stored or transmitted.

Sensors (S), such as gauges, may be positioned about oilfield 100 to collect data relating to various oilfield operations as described previously. As shown, sensor (S) is positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors (S) may also be positioned in one or more locations in the circulating system.

Drilling tools 106b may include a bottom hole assembly (BHA) (not shown), generally referenced, near the drill bit (e.g., within several drill collar lengths from the drill bit). The bottom hole assembly includes capabilities for measuring, processing, and storing information, as well as communicating with surface unit 134. The bottom hole assembly further includes drill collars for performing various other measurement functions.

The bottom hole assembly may include a communication subassembly that communicates with surface unit 134. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electro-magnetic signal, which is representative of the measured drilling parameters. It will be appreciated by one of skill in the art that a variety of telemetry systems may be employed, such as wired drill pipe, electromagnetic or other known telemetry systems.

Typically, the wellbore is drilled according to a drilling plan that is established prior to drilling. The drilling plan typically sets forth equipment, pressures, trajectories and/or other parameters that define the drilling process for the wellsite. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected The data gathered by sensors (S) may be collected by surface unit 134 and/or other data collection sources for analysis or other processing. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 134 may include transceiver 137 to allow communications between surface unit 134 and various portions of the oilfield 100 or other locations. Surface unit 134 may also be provided with or functionally connected to one or more controllers (not shown) for actuating mechanisms at oilfield 100. Surface unit 134 may then send command signals to oilfield 100 in response to data received. Surface unit 134 may receive commands via transceiver 137 or may itself execute commands to the controller. A processor may be provided to analyze the data (locally or remotely), make the decisions and/or actuate the controller. In this manner, oilfield 100 may be selectively adjusted based on the data collected. This technique may be used to optimize (or improve) portions of the field operation, such as controlling drilling, weight on bit, pump rates, or other parameters. These adjustments may be made automatically based on computer protocol, and/or manually by an operator. In some cases, well plans may be adjusted to select optimum (or improved) operating conditions, or to avoid problems.

Figure 1C:
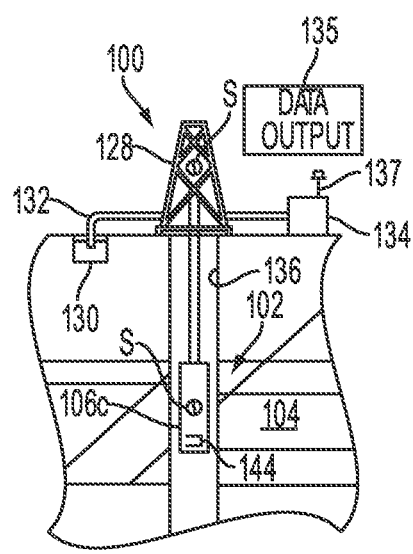

FIG. 1C illustrates a wireline operation being performed by wireline tool 106c suspended by rig 128 and into wellbore 136 of FIG. 1B. Wireline tool 106c is adapted for deployment into wellbore 136 for generating well logs, performing downhole tests and/or collecting samples. Wireline tool 106c may be used to provide another method and apparatus for performing a seismic survey operation. Wireline tool 106c may, for example, have an explosive, radioactive, electrical, or acoustic energy source 144 that sends and/or receives electrical signals to surrounding subterranean formations 102 and fluids therein.

Wireline tool 106c may be operatively connected to, for example, geophones 118 and a computer 122a of a seismic truck 106a of FIG. 1A. Wireline tool 106c may also provide data to surface unit 134. Surface unit 134 may collect data generated during the wireline operation and may produce data output 135 that may be stored or transmitted. Wireline tool 106c may be positioned at various depths in the wellbore 136 to provide a survey or other information relating to the subterranean formation 102.

Sensors (S), such as gauges, may be positioned about oilfield 100 to collect data relating to various field operations as described previously. As shown, sensor S is positioned in wireline tool 106c to measure downhole parameters which relate to, for example porosity, permeability, fluid composition and/or other parameters of the field operation.

Figure 1D:
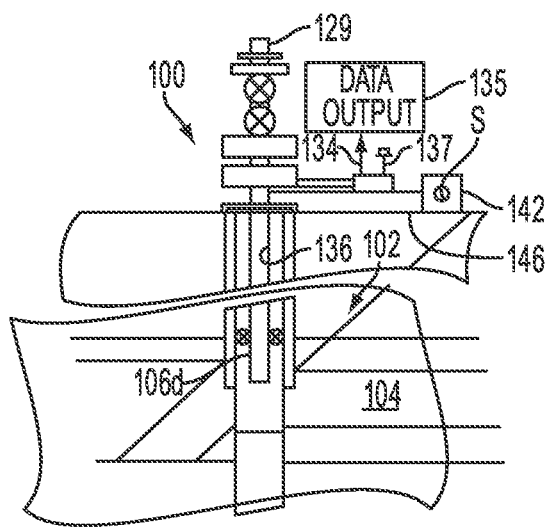

FIG. 1D illustrates a production operation being performed by production tool 106d deployed from a production unit or Christmas tree 129 and into completed wellbore 136 for drawing fluid from the downhole reservoirs into surface facilities 142. The fluid flows from reservoir 104 through perforations in the casing (not shown) and into production tool 106d in wellbore 136 and to surface facilities 142 via gathering network 146.

Sensors (S), such as gauges, may be positioned about oilfield 100 to collect data relating to various field operations as described previously. As shown, the sensor (S) may be positioned in production tool 106d or associated equipment, such as Christmas tree 129, gathering network 146, surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While FIGS. 1B-1D illustrate tools used to measure properties of an oilfield, it will be appreciated that the tools may be used in connection with non-oilfield operations, such as gas fields, mines, aquifers, storage or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configurations of FIGS. 1A-1D are intended to provide a brief description of an example of a field usable with oilfield application frameworks. Part of, or the entirety, of oilfield 100 may be on land, water and/or sea. Also, while a single field measured at a single location is depicted, oilfield applications may be utilized with any combination of one or more oilfields, one or more processing facilities and one or more wellsites.

Figure 2:
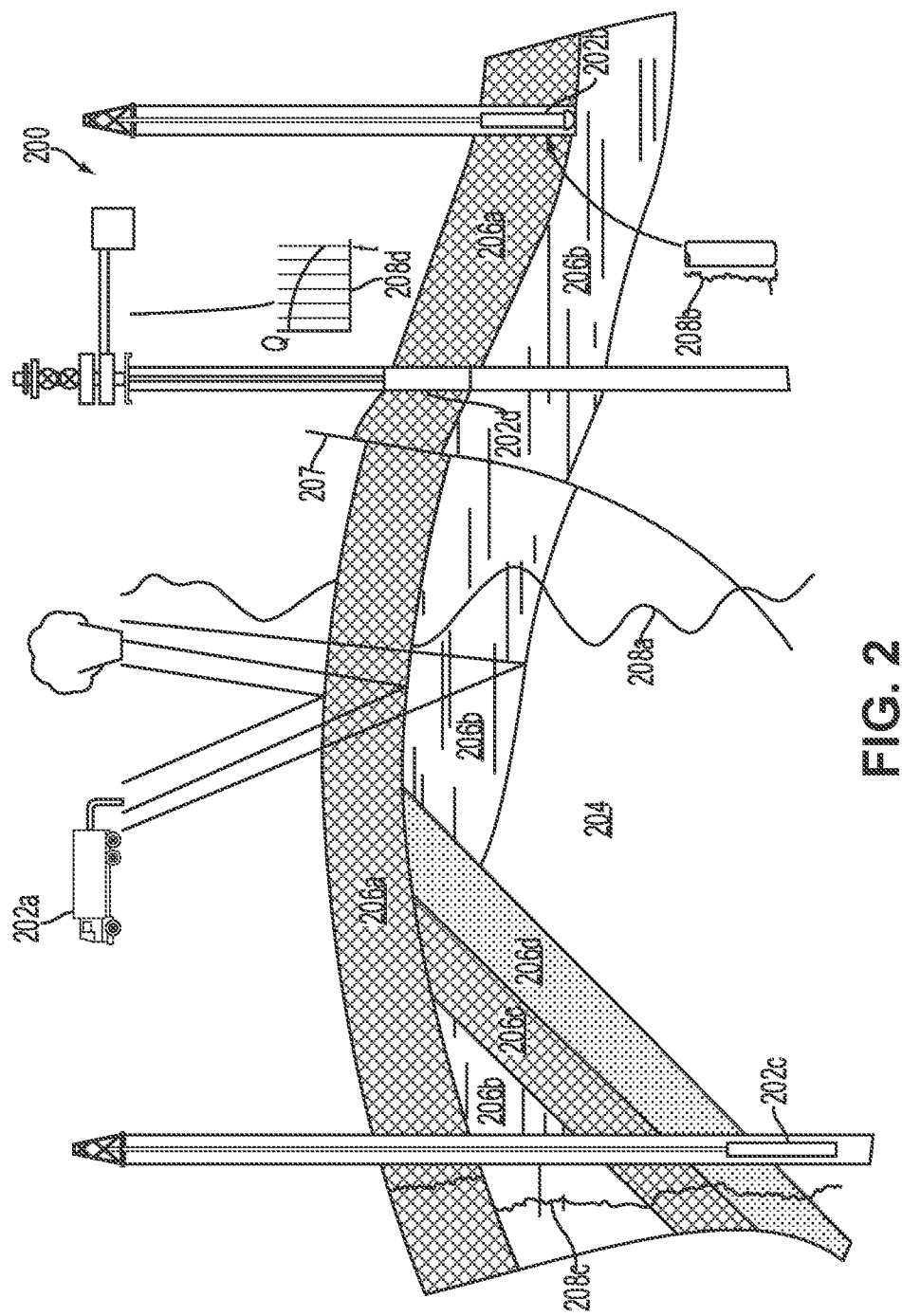

FIG. 2 illustrates a schematic view, partially in cross section of oilfield 200 having data acquisition tools 202a, 202b, 202c and 202d positioned at various locations along oilfield 200 for collecting data of subterranean formation 204 in accordance with implementations of various technologies and techniques described herein. Data acquisition tools 202a-202d may be the same as data acquisition tools 106a-106d of FIGS. 1A-1D, respectively, or others not depicted. As shown, data acquisition tools 202a-202d generate data plots or measurements 208a-208d, respectively. These data plots are depicted along oilfield 200 to demonstrate the data generated by the various operations.

Data plots 208a-208c are examples of static data plots that may be generated by data acquisition tools 202a-202c, respectively; however, it should be understood that data plots 208a-208c may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208a is a seismic two-way response over a period of time. Static plot 208b is core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208c is a logging trace that typically provides a resistivity or other measurement of the formation at various depths.

A production decline curve or graph 208d is a dynamic data plot of the fluid flow rate over time. The production decline curve typically provides the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 204 has a plurality of geological formations 206a-206d. As shown, this structure has several formations or layers, including a shale layer 206a, a carbonate layer 206b, a shale layer 206c and a sand layer 206d. A fault 207 extends through the shale layer 206a and the carbonate layer 206b. The static data acquisition tools are adapted to take measurements and detect characteristics of the formations.

While a specific subterranean formation with specific geological structures is depicted, it will be appreciated that oilfield 200 may contain a variety of geological structures and/or formations, sometimes having extreme complexity. In some locations, typically below the water line, fluid may occupy pore spaces of the formations. Each of the measurement devices may be used to measure properties of the formations and/or its geological features. While each acquisition tool is shown as being in specific locations in oilfield 200, it will be appreciated that one or more types of measurement may be taken at one or more locations across one or more fields or other locations for comparison and/or analysis.

The data collected from various sources, such as the data acquisition tools of FIG. 2, may then be processed and/or evaluated. Typically, seismic data displayed in static data plot 208a from data acquisition tool 202a is used by a geophysicist to determine characteristics of the subterranean formations and features. The core data shown in static plot 208b and/or log data from well log 208c are typically used by a geologist to determine various characteristics of the subterranean formation. The production data from graph 208d is typically used by the reservoir engineer to determine fluid flow reservoir characteristics. The data analyzed by the geologist, geophysicist and the reservoir engineer may be analyzed using modeling techniques.

Figure 3A:
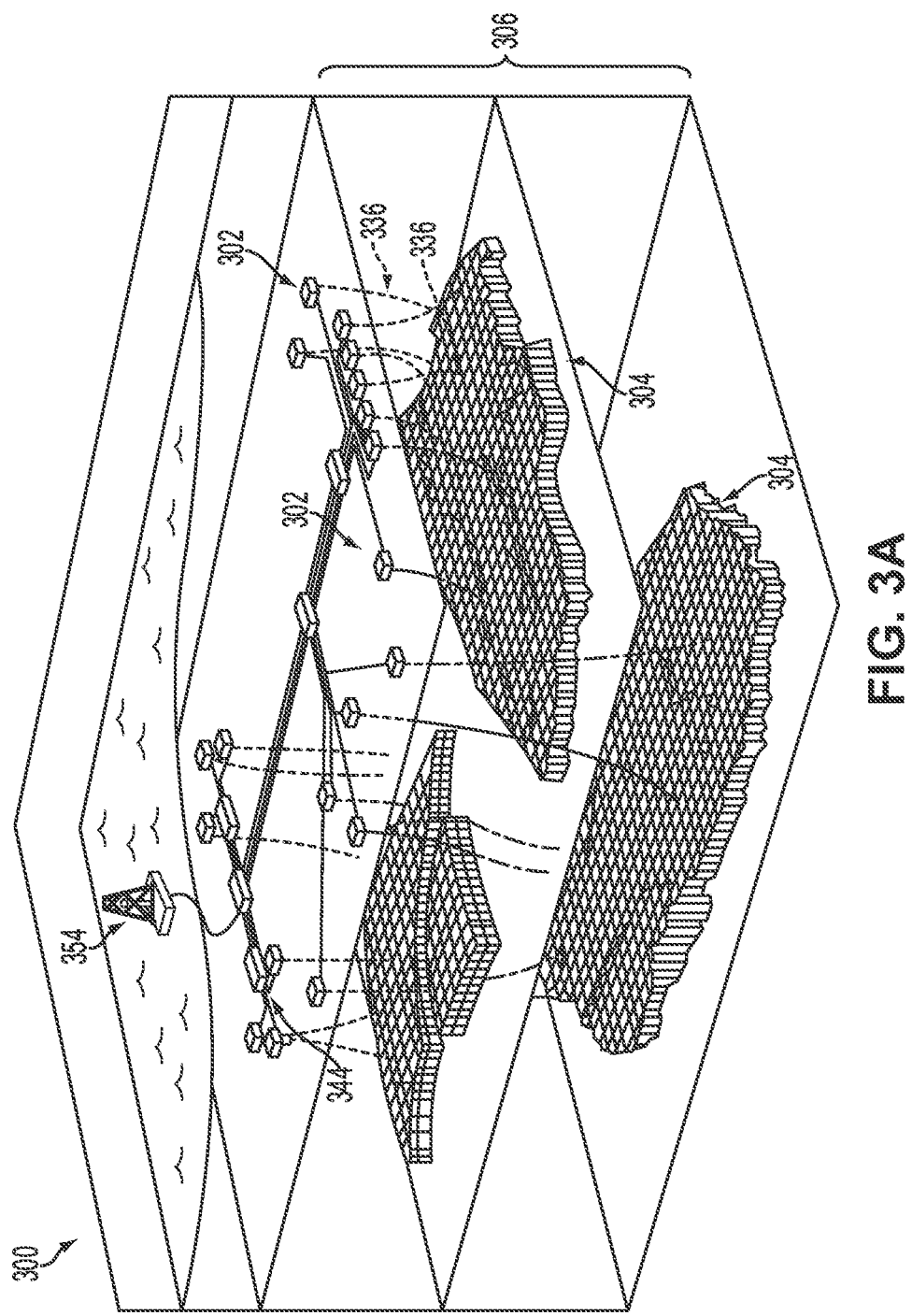

FIG. 3A illustrates an oilfield 300 for performing production operations in accordance with implementations of various technologies and techniques described herein. As shown, the oilfield has a plurality of wellsites 302 operatively connected to central processing facility 354. The oilfield configuration of FIG. 3A is not intended to limit the scope of the oilfield application system. Part, or all, of the oilfield may be on land and/or sea. Also, while a single oilfield with a single processing facility and a plurality of wellsites is depicted, any combination of one or more oilfields, one or more processing facilities and one or more wellsites may be present.

Each wellsite 302 has equipment that forms wellbore 336 into the earth. The wellbores extend through subterranean formations 306 including reservoirs 304. These reservoirs 304 contain fluids, such as hydrocarbons. The wellsites draw fluid from the reservoirs and pass them to the processing facilities via surface networks 344. The surface networks 344 have tubing and control mechanisms for controlling the flow of fluids from the wellsite to processing facility 354.

Figure 3B:
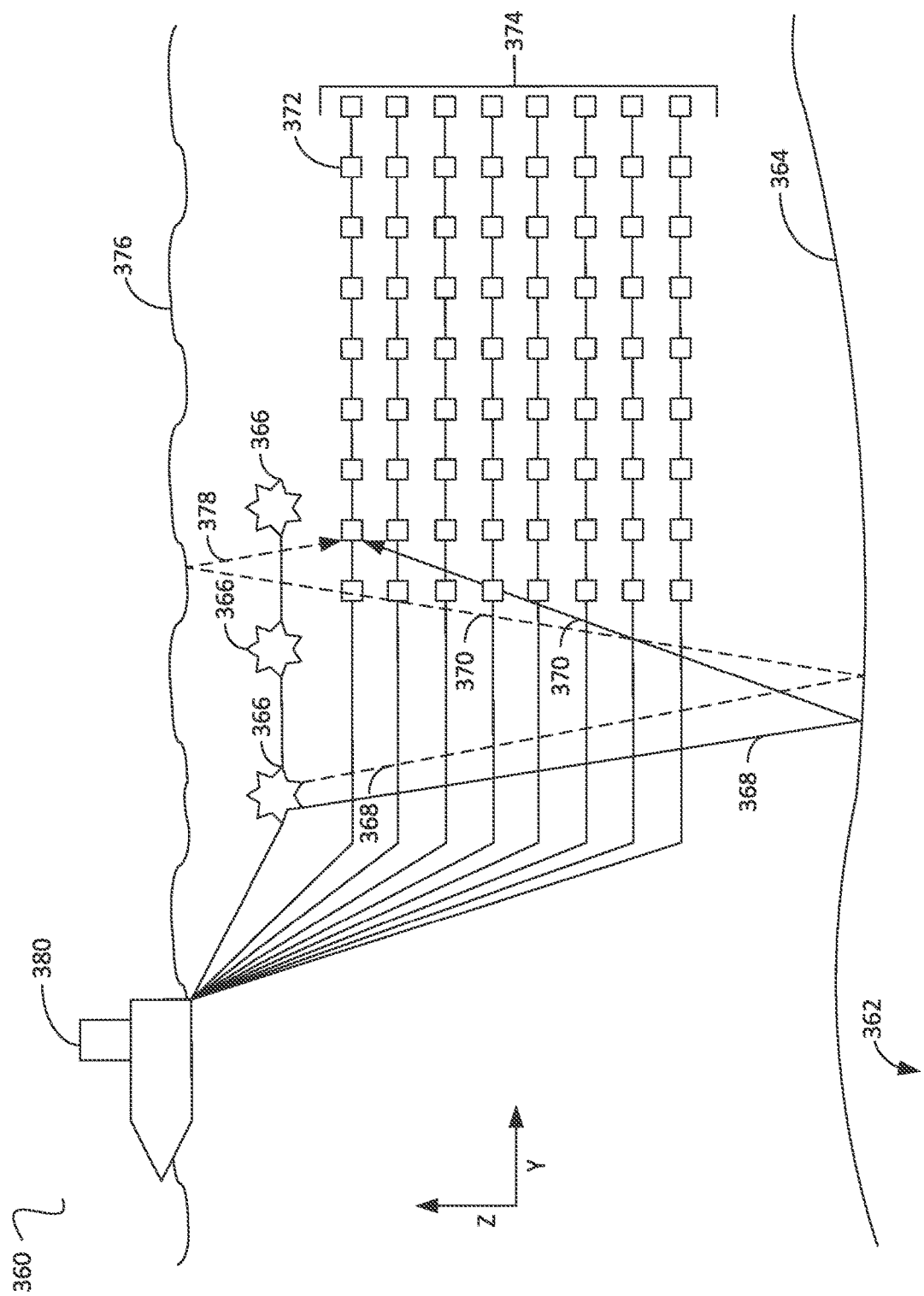

Attention is now directed to FIG. 3B, which illustrates a side view of a marine-based survey 360 of a subterranean subsurface 362 in accordance with one or more implementations of various techniques described herein. Subsurface 362 includes seafloor surface 364. Seismic sources 366 may include marine sources such as vibroseis or airguns, which may propagate seismic waves 368 (e.g., energy signals) into the Earth over an extended period of time or at a nearly instantaneous energy provided by impulsive sources. The seismic waves may be propagated by marine sources as a frequency sweep signal. For example, marine sources of the vibroseis type may initially emit a seismic wave at a low frequency (e.g., 5 Hz) and increase the seismic wave to a high frequency (e.g., 80-90 Hz) over time.

The component(s) of the seismic waves 368 may be reflected and converted by seafloor surface 364 (i.e., reflector), and seismic wave reflections 370 may be received by a plurality of seismic receivers 372. Seismic receivers 372 may be disposed on a plurality of streamers (i.e., streamer array 374). The seismic receivers 372 may generate electrical signals representative of the received seismic wave reflections 370. The electrical signals may be embedded with information regarding the subsurface 362 and captured as a record of seismic data.

In one implementation, each streamer may include streamer steering devices such as a bird, a deflector, a tail buoy and the like, which are not illustrated in this application. The streamer steering devices may be used to control the position of the streamers in accordance with the techniques described herein.

In one implementation, seismic wave reflections 370 may travel upward and reach the water/air interface at the water surface 376, a portion of reflections 370 may then reflect downward again (i.e., sea-surface ghost waves 378) and be received by the plurality of seismic receivers 372. The sea-surface ghost waves 378 may be referred to as surface multiples. The point on the water surface 376 at which the wave is reflected downward is generally referred to as the downward reflection point.

The electrical signals may be transmitted to a vessel 380 via transmission cables, wireless communication or the like. The vessel 380 may then transmit the electrical signals to a data processing center. Alternatively, the vessel 380 may include an onboard computer capable of processing the electrical signals (i.e., seismic data). Those skilled in the art having the benefit of this disclosure will appreciate that this illustration is highly idealized. For instance, surveys may be of formations deep beneath the surface. The formations may typically include multiple reflectors, some of which may include dipping events, and may generate multiple reflections (including wave conversion) for receipt by the seismic receivers 372. In one implementation, the seismic data may be processed to generate a seismic image of the subsurface 362.

Marine seismic acquisition systems tow each streamer in streamer array 374 at the same depth (e.g., 5-10 m). However, marine based survey 360 may tow each streamer in streamer array 374 at different depths such that seismic data may be acquired and processed in a manner that avoids the effects of destructive interference due to sea-surface ghost waves. For instance, marine-based survey 360 of FIG. 3B illustrates eight streamers towed by vessel 380 at eight different depths. The depth of each streamer may be controlled and maintained using the birds disposed on each streamer.

Figure 4:
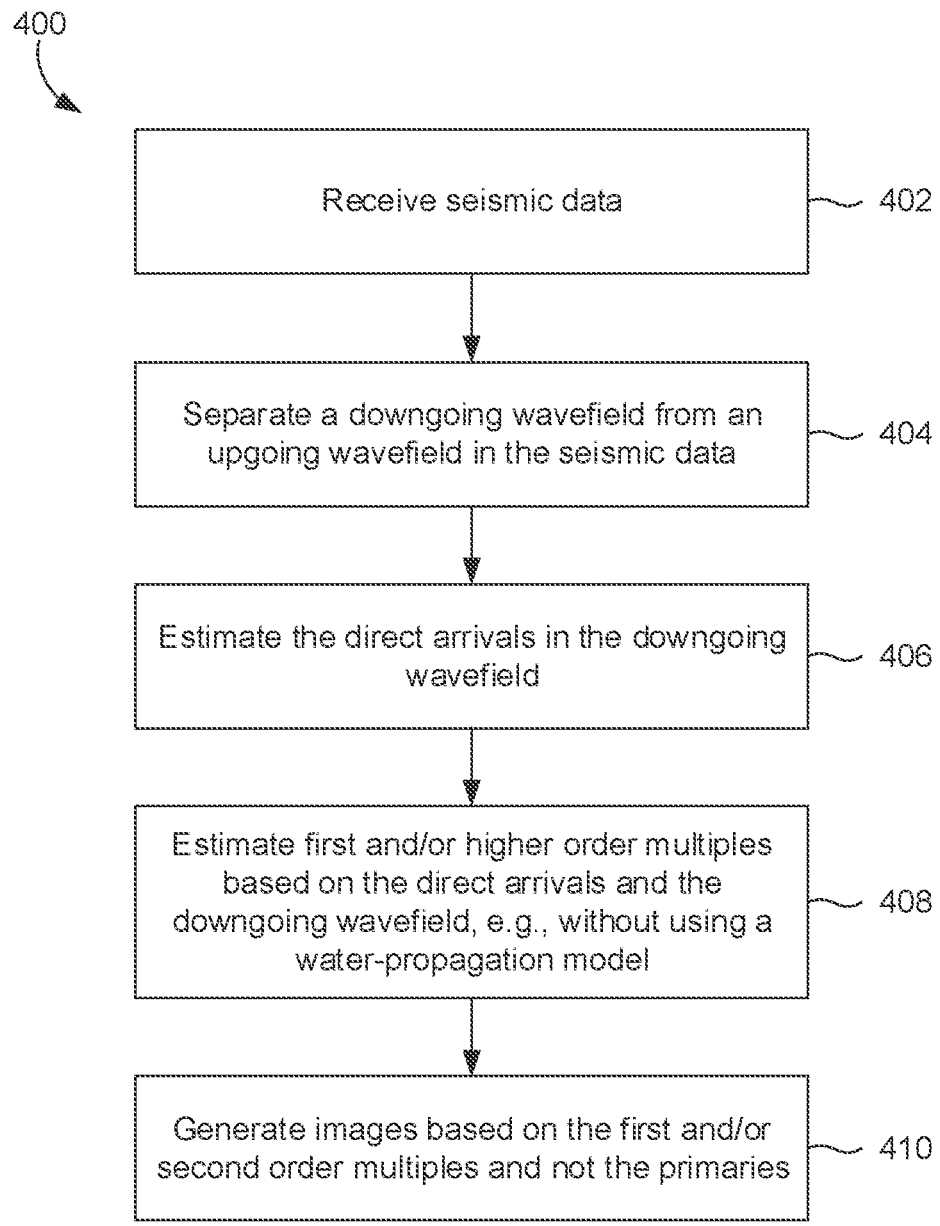
FIG. 4 illustrates a flowchart of a method for seismic imaging one or more downgoing multiples reflection signals, according to an embodiment.

FIG. 4 illustrates a flowchart of a method 400 for seismic imaging, e.g., by imaging multiple reflection signals contained in seismic data, according to an embodiment. The method 400 may thus begin by receiving seismic data, as at 402. As explained above, the seismic data may be marine seismic data acquired using one or more receivers positioned at or near an ocean floor and using one or more sources positioned proximal to a free surface (e.g., the ocean surface).

The seismic data may include an upgoing wavefield and a downgoing wavefield, and the method 400 may include separating the upgoing wavefield from the downgoing wavefield, as at 404. In some embodiments, multicomponent measurements may be used to achieve such separation. For example, a hydrophone (P) and vertical geophone/accelerometer (Vz or Az) may be used for the up-down separation; in such case, the projection from the vertical to the actual wavefield direction can be handled in the plane-wave domain or in the time space domain.

The method 400 may also include estimating the downgoing direct arrivals in the downgoing wavefield, as at 406. Estimation of the downgoing direct arrivals, when conducted, may be accomplished using a cross-ghosting operator difference in a wavenumber domain to calculate the downgoing direct arrivals (including signature, ghost, and bubble effects). In another embodiment, such direct arrival estimation may be achieved using nearfield hydrophone measurements or modeling to calculate the directional far field signature and, hence, the downgoing direct arrivals. In some embodiments, direct arrivals may not be estimated. In some embodiments of the method 400, the purpose of estimating the direct arrivals is to subtract them from the downgoing wavefield when estimating the multiple reflection signals. In some embodiments, the direct arrivals may be directly muted, and thus may not be estimated separately from the subtraction process.

The method 400 may then proceed to estimating first and/or higher (e.g., second) order multiples based on the direct arrivals and the downgoing wavefield, as at 408. In general, using an up/down wavefield deconvolution, a subsurface reflectivity operator may be generated. However, in order to use the subsurface reflectivity operator to determine downgoing multiples, a free surface reflectivity and delay operator for two-way travel through the water may be called for, which is generally calculated using a water-propagation model. Such a technique thus relies upon the accuracy of the water-propagation model. However, complexities in water-propagation may leave the model thereof somewhat inaccurate. Thus, embodiments of the present method may employ data-driven, measured signal operators for the downgoing wavefield and the direct arrivals, which may permit direct calculation of the multiple reflections in the downgoing wavefield without using a water-propagation model.

Once the first and/or higher order multiples are estimated in the downgoing wavefield, the method 400 may proceed to generating images based on the multiple reflection signals, as at 410. The multiples may be separated by order, which may enhance imaging. Further, as noted above, these signals may provide insight into subsurface reflectivity that may otherwise not be apparent solely from primary reflections. Thus, these images may be used to construct velocity models of the subsurface that are more accurate representations of the subsurface domain of interest. In addition, having access to the multiples may be used to complement amplitude versus offset (AVO) analysis that may generally be performed on primaries, but not on multiples, apart from within the context of the present disclosure. This may enhance imaging of shallow targets.

Figure 5:
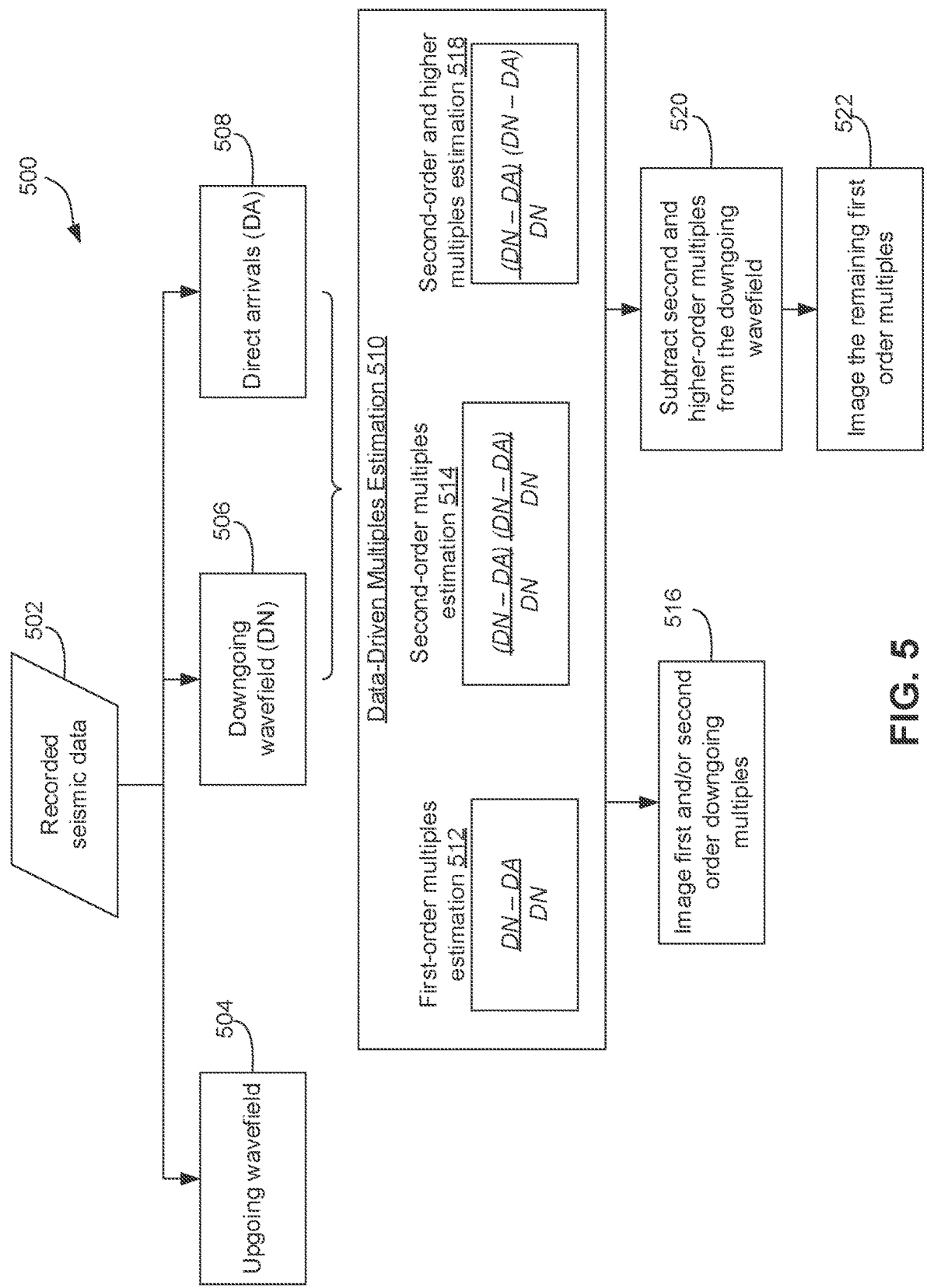
FIG. 5 illustrates a flowchart of a method for seismic imaging one or more downgoing multiples reflection signals, according to an embodiment.

FIG. 5 illustrates a flowchart of a method 500 for generating images of multiple reflections in seismic data, according to an embodiment. The method 500 may be a more detailed embodiment of portions of method 400, and thus the two should not be considered mutually exclusive. As with the method 400, the method 500 may begin by receiving seismic data, as at 502. The seismic data may include, and thus be separated into, an upgoing wavefield 504 and a downgoing wavefield 506, e.g., in a plane-wave domain (frequency-wavenumber or intercept-slowness). Further, the downgoing wavefield, as noted above, may include a direct arrival component 508, which may be estimated.

Figure 6A:
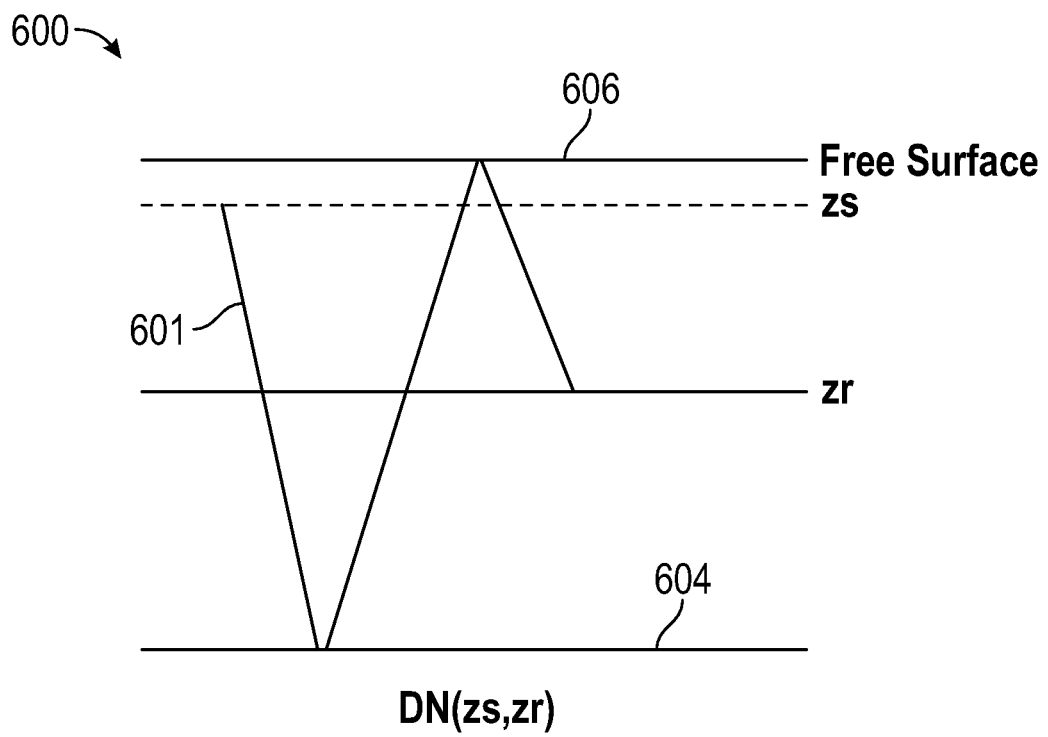
FIG. 6A illustrates an environment in which a first-order, downgoing signal is present, according to an embodiment.

FIG. 6A illustrates an environment 600 in which a first order downgoing signal 601 is present. The source of the event is at the depth zs, and the receiver is at the depth zr. The signal 601 is reflected off of a reflector 604, e.g., the ocean bottom, and again off of a free surface 606, e.g., the ocean surface, before being received at the receiver.

Figure 6B:
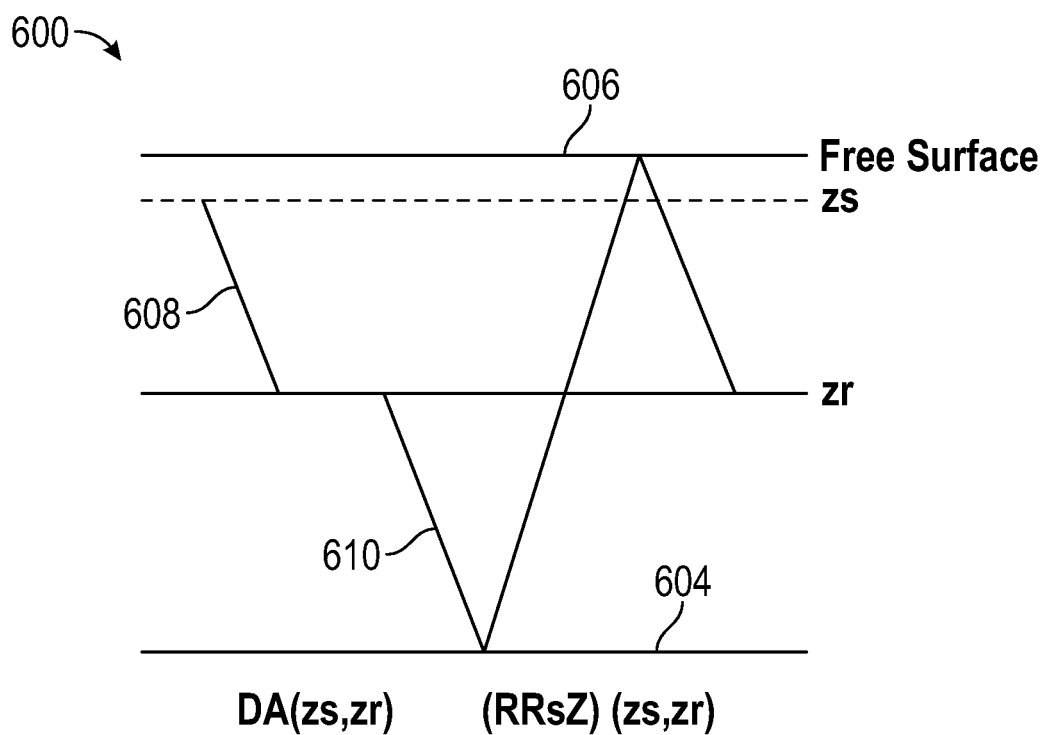
FIG. 6B illustrates the environment, with the downgoing signal broken into its components, according to an embodiment.

FIG. 6B illustrates the environment 600, with the downgoing signal 601 broken into its components, according to an embodiment. In particular, the signal 601 includes a direct arrival signal 608 and a first-order free-surface receiver side multiple signal (RR$_s$Z) 610.

Figure 6C:
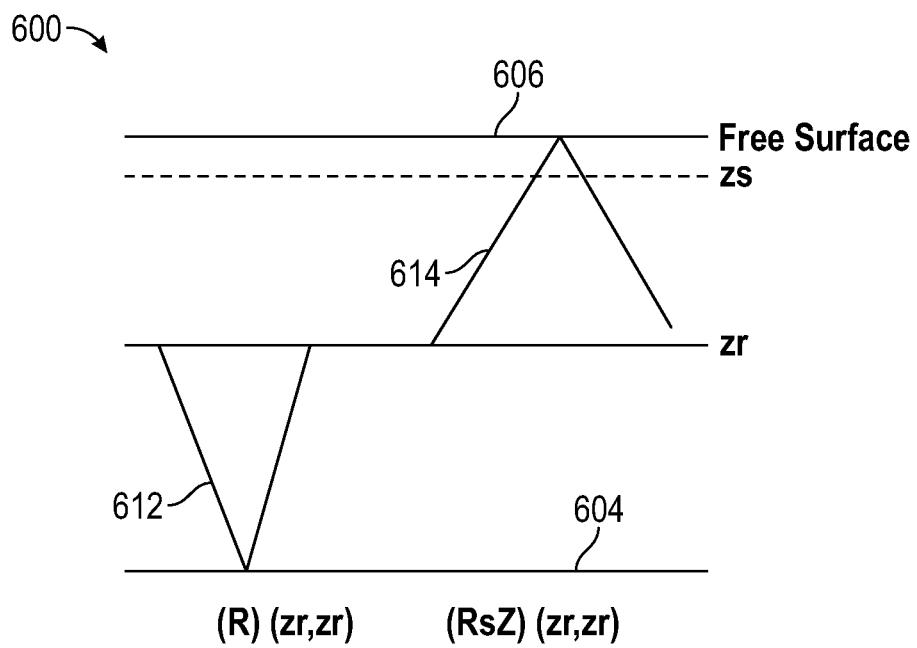
FIG. 6C illustrates the environment including first-order, free-surface, receiver-side multiple signal broken into its component parts, according to an embodiment.

FIG. 6C illustrates the environment 600 including first-order, free-surface, receiver side multiple signal 610 broken into its component parts, according to an embodiment. In particular, the multiple signal 610 includes a signal (R) 612 reflected from the reflector 604, and a component (R$_s$Z) 614 that models the propagation in the water with a reflection from the free surface 606 reflected from the free surface 606.

The downgoing wavefield may be approximated using a recursive relationship in the plane-wave domain between the downgoing wavefield, direct arrivals, and reflectivity as:

$$DN = DA + (RR_sZ)DN \tag{1}$$

where DN is the downgoing wavefield, DA is the direct arrival, R is the reflectivity response of the stack of layers below the recording depth zr, R$_s$ is a reflection response at the free surface (e.g., a scalar, such as approximately −1), and Z is a delay operator for two-way travel time between a recording depth zr and the free surface 502 (z=0). From FIGS. 6A-6C, it will be appreciated that the signal 612 may thus be an illustration of R, while the signal 614 may be an illustration of (RsZ), which may lead to a first-order free-surface receiver side multiple ("ghost") (RRsZ) (e.g., signal 610) referenced at zr. Assuming that DN and DA are for sources at zs and receivers at zr, this multiple can be referenced either at zs or zr.

Before proceeding further, a brief discussion of subsurface reflectivity R and an up/downgoing wavefield deconvolution (UDD) process may be instructive for understanding equation (1). Subsurface reflectivity R may be expressed as accounting for the difference between the upgoing wavefield and the downgoing wavefield (in the F-K or F-p domain), e.g.:

$$U = R(DN) \tag{2}$$

which can be inverted to:

$$R = \frac{U(\overline{DN})}{(DN)(\overline{DN}) + \varepsilon^2} \tag{3}$$

where ε is a stabilization factor to prevent noise resulting from spectral notches. Since the upgoing and downgoing wavefields are measured and/or estimated, e.g., using PZ summation, the reflectivity R may be estimated. As expressed in equation (3), UDD in a plane-wave domain yields an estimation of the reflectivity at the seabed, without signature and source ghost effects. Embodiments of the present disclosure may build upon UDD, forming a new process that may be referred to as downgoing demultiple processing (DGD).

In a downgoing demultiple (DGD) process, generally depicted in box 510 of FIG. 5, equation (1) may be inverted to estimate a first-order multiple ($RR_sZ$) in the downgoing wavefield. This may be expressed, as shown in box 512, as:

$$RR_S Z = \frac{DN - DA}{DN} \quad (4)$$

There may be two options to solve for the first-order, downgoing multiple RRsZ based on equation (4). The first relies on up/downgoing deconvolution (UDD), which produces an estimation for seabed reflectivity R, as discussed above. A water propagation model may then be constructed to estimate RsZ, and thus the convolution of the two operators R and RsZ results in the first-order, downgoing multiple. However, this option may be sensitive to the accuracy of the propagation model and the complexities of the water environment being modeled.

Another option is to rely on the measurements that make up the data operators for the downgoing wavefield DN and the direct arrivals DA. Since DN and DA are data-driven operators, the complexities of propagation in the water may be implicitly included, and thus the method 500 may avoid sensitivity to the water propagation model accurately accounting for physical complexities. For example, there may be a one dimensional (1D) or "layer cake" medium assumption in the methods discussed herein. The medium includes water. As such, inaccuracies in the model may arise from non-1D propagation in the water layer. As will be apparent from equation (4), however, this option calls for estimation and subtraction of the direct arrivals, or direct removal thereof from the downgoing wavefield, i.e., DN-DA.

As explained above, the direct arrivals may be estimated using various techniques. When subtracted from the downgoing wavefield, an intermediate or "modified" downgoing wavefield (DN-DA) is created, which may then be deconvolved from the initial downgoing wavefield (DN), completing the calculation of the right-hand side of equation (4), and thus yielding the data-driven calculation of the first-order downgoing multiple, RRsZ, as in box 512.

This deconvolution may remove source ghost, source bubble, and directivity effects, but in some embodiments, additional shaping may be employed to a user-specified ghost-free signature. As noted above, the approach illustrated by equation (4) may not require a model of the water layer to obtain the sub-event input to mirror migration; however, migration with a mirror image model may still call for a water-layer model.

When processing the down-going wavefield, the direct arrival is estimated, the first water bounce (downgoing multiple) is the target/desired wavefield or "primaries", and higher order events with at least two bounces off the free surface are undesired and considered as "multiples". Equation (4) directly predicts this target wavefield using data-based operators referenced at zr. However, in some cases, a two-part approach may be employed, including prediction of undesired events followed by an adaptive subtraction. Such a two-part approach improves the robustness of the process against imperfection/assumption in the prediction of the multiple (e.g., 1D earth assumption implicit in this process) and generally reduce residual noise. For example, the two-part approach may more accurately predict multiples (using data-driven operators), and adaptive subtraction may further enhance this approach. In practice, the use of adaptivity may be minimized in favor of straight subtraction, where possible. This implies that the model of multiples is close to the multiples in the data.

Thus, the first part of the two-part approach is to identify the unwanted higher-order multiples. Referring again to equation (1), higher-order bounces of the down-going wavefield can also be estimated using data-based operators. Moving to a second recursive instance of equation (1) yields:

$$DN = DA + (RR_S Z)(DA + (RR_S Z)DN) = DA + (RR_S Z)DA + (RR_S Z)^2 DN \quad (5)$$

The last term in the second part of equation (5) represents (approximates) the second and higher order downgoing multiples. These higher-order multiples can be expressed as:

$$MULT\_DN = (RR_S Z)^2 DN \quad (6)$$

Equation (6) can be interpreted as a model-based approach to describe the second and higher order bounces of the down-going multiples. It would thus use the reflectivity R estimated from UDD and a propagation model in the water layer for $R_S Z$. Such a model would then be used twice to solve equation (6). The MULT_DN wavefield may thus be referenced at acquisition datum (zr, zs).

However, the combination of equations (4) and (6) yields the term for the second order and higher order multiples estimation seen in box 518:

$$MULT\_DN = \frac{(DN - DA)(DN - DA)}{DN} \quad (7)$$

Thus, the second and higher order multiples, MULT_DN, may be predicted, as in box 518, with data-based operators DN and DA, thereby avoiding the drawbacks of using a propagation model in the water layer, since there is no $RR_S Z$ term. Such a data-driven prediction of down-going multiples may have more accurate timing, phase, and amplitude information, which in turn may facilitate adaptive subtraction, reducing risk of also attenuating primaries or target events. The adaptive subtraction may be done in any domain, e.g., in the plane-wave domain or in the time-space domain.

When using the two-part approach (multiple prediction and subtraction), the deconvolution process (as in equation (4)) may not provide 3D source designature and 3D deghosting. However, this can also be obtained by a deconvolution with the downgoing direct arrival (DA) in the plane wave domain. Such a deconvolution provides 3D designature and 3D deghosting functionalities, as per UDD and DGD (equation (4)) processes. This deconvolution can be applied to the complete down-going wavefield and to the predicted downgoing multiple wavefield before multiple subtraction. Alternatively, it could be applied after multiple subtraction. Thus, embodiments of the method 400 predict the down-going multiples as a whole (order two and above) using data-based operators and hence making the prediction process more robust against 1D earth assumptions. Moreover, following of the recursive property of the down-going field (equation (1)), this can be generalized to any order.

Thus, the method 500 may include adaptively subtracting the second and higher-order multiples from the downgoing wavefield, as at 520. The first order multiples, which may be calculated using the downgoing wavefield, as discussed above, but potentially after the second and higher order multiples are subtracted therefrom, may then be imaged, as at 522.

In some embodiments, the estimation of the first-order, downgoing multiple may be sufficient, but in other embodiments, a second order, downgoing multiple may be calculated, again based on equations (1) and (4). In particular, the second order multiple may be calculated by adding the next order term for DN to the recursive equation (1), as indicated in box 514:

$$(RR_SZ)^2 = \frac{DN - DA - (RR_SZ)DA}{DN} = \frac{(DN - DA)(DN - DA)}{DNDN} \quad (8)$$

This relationship may also be solved using the same data-driven operators as equation (4), and thus may be calculated directly based on the estimation of the downgoing wavefield DN and the direct arrivals DA, also without using a water-propagation model. Indeed, having estimated the first order free-surface down-going multiple (with either the one-part or the two-part approaches discussed above) via equation (4), the free-surface, down-going multiple can be used with equation (1) to recursively obtain higher order multiple data separated by order, e.g., by increasing the exponent on the left side of equation (8) and updating the right side accordingly.

As noted above, the first and/or second order multiples, estimated using one or more embodiments discussed above, may be employed to create a seismic image, and/or used to create a model (e.g., velocity model) that may assist in characterizing the subsurface domain more precisely and efficiently.

In one or more embodiments, the functions described can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

Figure 7:
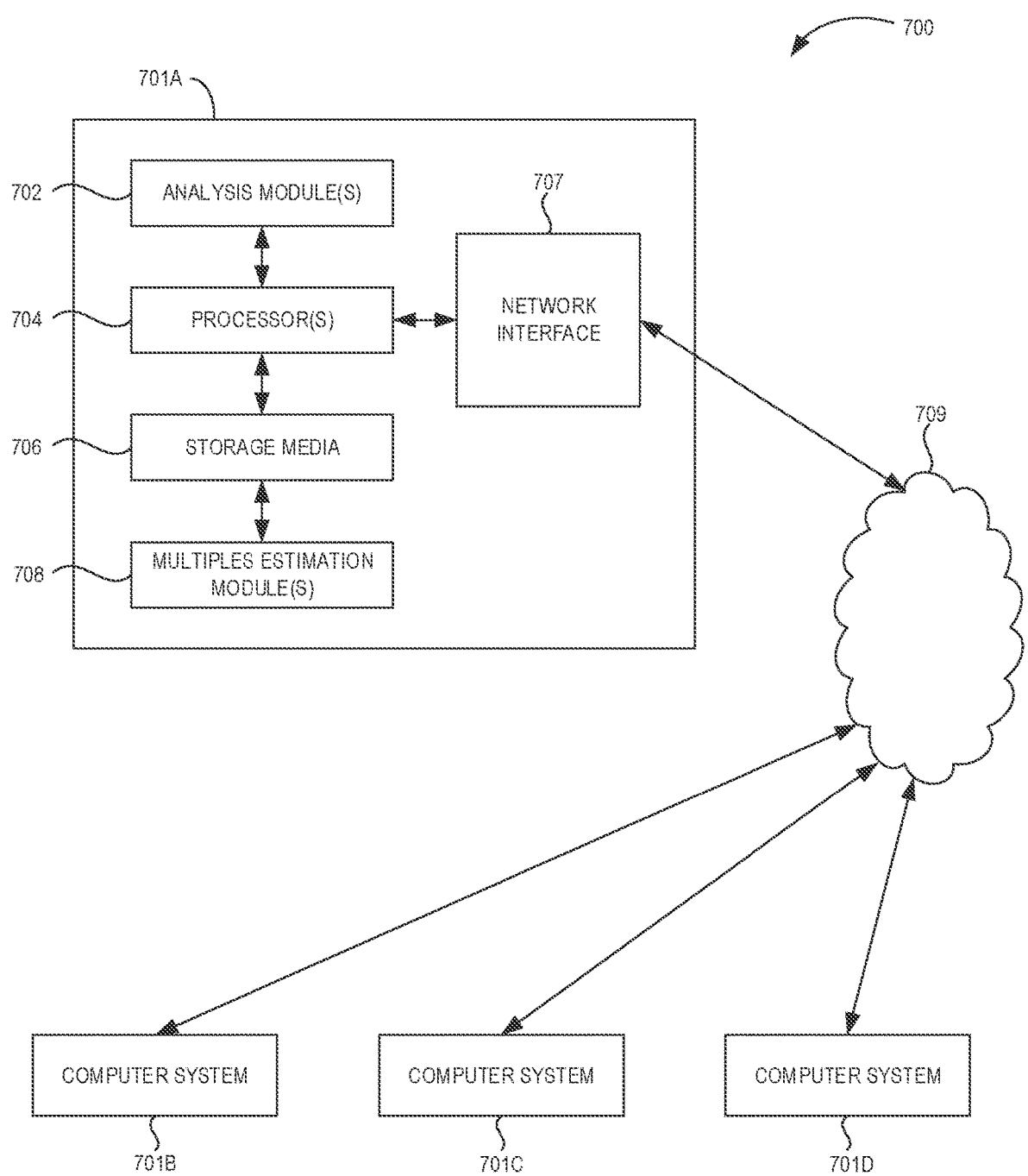
FIG. 7 illustrates a schematic view of a computing system, according to an embodiment.

In some embodiments, any of the methods of the present disclosure may be executed by a computing system. FIG. 7 illustrates an example of such a computing system 700, in accordance with some embodiments. The computing system 700 may include a computer or computer system 701A, which may be an individual computer system 701A or an arrangement of distributed computer systems. The computer system 701A includes one or more analysis module(s) 702 configured to perform various tasks according to some embodiments, such as one or more methods disclosed herein. To perform these various tasks, the analysis module 702 executes independently, or in coordination with, one or more processors 704, which is (or are) connected to one or more storage media 706. The processor(s) 704 is (or are) also connected to a network interface 707 to allow the computer system 701A to communicate over a data network 709 with one or more additional computer systems and/or computing systems, such as 701B, 701C, and/or 701D (note that computer systems 701B, 701C and/or 701D may or may not share the same architecture as computer system 701A, and may be located in different physical locations, e.g., computer systems 701A and 701B may be located in a processing facility, while in communication with one or more computer systems such as 701C and/or 701D that are located in one or more data centers, and/or located in varying countries on different continents).

A processor can include a microprocessor, microcontroller, processor module or subsystem, programmable integrated circuit, programmable gate array, or another control or computing device.

The storage media 706 can be implemented as one or more computer-readable or machine-readable storage media. Note that while in the example embodiment of FIG. 7 storage media 706 is depicted as within computer system 701A, in some embodiments, storage media 706 may be distributed within and/or across multiple internal and/or external enclosures of computing system 701A and/or additional computing systems. Storage media 706 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In some embodiments, computing system 700 contains one or more multiples estimation module(s) 708. In the example of computing system 700, computer system 701A includes the multiples estimation module 708. In some embodiments, a single multiples estimation module may be used to perform some or all aspects of one or more embodiments of the methods. In alternate embodiments, a plurality of multiples estimation modules may be used to perform some or all aspects of methods.

It should be appreciated that computing system 700 is only one example of a computing system, and that computing system 700 may have more or fewer components than shown, may combine additional components not depicted in the example embodiment of FIG. 7, and/or computing system 700 may have a different configuration or arrangement of the components depicted in FIG. 7. The various components shown in FIG. 7 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

Interpretations, models and/or other interpretation aids may be refined in an iterative fashion; this concept is applicable to embodiments of the present methods discussed herein. This can include use of feedback loops executed on an algorithmic basis, such as at a computing device (e.g., computing system 700, FIG. 7), and/or through manual control by a user who may make determinations regarding whether a given step, action, template, model, or set of curves has become sufficiently accurate for the evaluation of the subsurface three-dimensional geologic formation under consideration.

Further, it will be appreciated that the steps of the methods disclosed herein may be performed in the order in which they are described, or performed in a different order, without departing from the scope of the present disclosure. Further, the steps may be combined, separated, or performed in parallel or simultaneously, consistent with the present disclosure.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. Moreover, the order in which the elements of the methods are illustrated and described may be re-arranged, and/or two or more elements may occur simultaneously. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
 receiving seismic data comprising signals collected using a receiver;
 separating a downgoing wavefield from an upgoing wavefield in the signals;
 generating a modified downgoing wavefield by removing direct arrivals from the downgoing wavefield;
 estimating a first-order multiple reflection signal at least partially by deconvolving the modified downgoing wavefield and the downgoing wavefield; and
 generating a seismic image based at least in part on the estimated first-order multiple reflection signal.

2. The method of claim 1, further comprising estimating a second-order multiple reflection signal based on the downgoing wavefield and the direct arrivals.

3. The method of claim 2, wherein the seismic image is generated based on a combination of the first-order and second-order multiple reflection signals.

4. The method of claim 1, further comprising:
 estimating second and higher order multiples by deconvolving the modified downgoing wavefield and the downgoing wavefield to generate an intermediate wavefield, and convolving the intermediate wavefield with the modified downgoing wavefield; and
 subtracting the second and higher order multiples from the downgoing wavefield before estimating the first-order multiple reflection signal.

5. The method of claim 1, wherein removing the direct arrivals comprises direct muting of the direct arrivals in the downgoing wavefield.

6. The method of claim 1, wherein removing the direct arrivals comprises estimating the direct arrivals and subtracting the direct arrivals from the downgoing wavefield.

7. The method of claim 1, wherein estimating the first-order downgoing multiple reflection signal is data-driven and does not rely on a water-propagation model, and wherein the seismic image that is generated does not include primary reflections.

8. The method of claim 1, further comprising generating a velocity model representing a subterranean domain using the first-order multiple reflection signal.

9. A non-transitory, computer-readable medium storing instructions that, when executed by at least one processor of a computing system, cause the computing system to perform operations, the operations comprising:
 receiving seismic data comprising signals collected using a receiver;
 separating a downgoing wavefield from an upgoing wavefield in the signals;
 generating a modified downgoing wavefield by removing direct arrivals from the downgoing wavefield;
 estimating a first-order multiple reflection signal at least partially by deconvolving the modified downgoing wavefield and the downgoing wavefield; and
 generating a seismic image based at least in part on the estimated first-order multiple reflection signal.

10. The medium of claim 9, wherein the operations further comprise estimating a second-order multiple reflection signal based on the downgoing wavefield and the direct arrivals.

11. The medium of claim 10, wherein the seismic image is generated based on a combination of the first-order and second-order multiple reflection signals.

12. The medium of claim 9, wherein the operations further comprise:
 estimating second and higher order multiples by deconvolving the modified downgoing wavefield and the downgoing wavefield to generate an intermediate wavefield, and convolving the intermediate wavefield with the modified downgoing wavefield; and
 subtracting the second and higher order multiples from the downgoing wavefield before estimating the first-order multiple reflection signal.

13. The medium of claim 9, wherein removing the direct arrivals comprises direct muting of the direct arrivals in the downgoing wavefield.

14. The medium of claim 9, wherein removing the direct arrivals comprises estimating the direct arrivals and subtracting the direct arrivals from the downgoing wavefield.

15. The medium of claim 9, wherein estimating the first-order multiple reflection signal is data-driven and does not rely on a water-propagation model, and wherein the seismic image that is generated does not include primary reflections.

16. The medium of claim 9, wherein the operations further comprise generating a velocity model representing a subterranean domain using the first-order multiple reflection signal.

17. A computing system, comprising:
one or more processors; and
a memory system including one or more non-transitory, computer-readable media storing instructions that, when executed by at least one processor of a computing system, cause the computing system to perform operations, the operations comprising:
  receiving seismic data comprising signals collected using a receiver;
  separating a downgoing wavefield from an upgoing wavefield in the signals;
  generating a modified downgoing wavefield by removing direct arrivals from the downgoing wavefield;
  estimating a first-order multiple reflection signal at least partially by deconvolving the modified downgoing wavefield and the downgoing wavefield; and
  generating a seismic image based at least in part on the estimated first-order multiple reflection signal.

18. The computing system of claim 17, wherein the operations further comprise estimating a second-order multiple reflection signal based on the downgoing wavefield and the direct arrivals.

19. The computing system of claim 18, wherein the seismic image is generated based on a combination of the first-order and second-order multiple reflection signals, and not based on primary reflections of the seismic data.

20. The computing system of claim 17, wherein the operations further comprise:
  estimating second and higher order multiples by deconvolving the modified downgoing wavefield and the downgoing wavefield to generate an intermediate wavefield, and convolving the intermediate wavefield with the modified downgoing wavefield; and
  subtracting the second and higher order multiples from the downgoing wavefield before estimating the first-order multiple reflection signal.

\* \* \* \* \*